US008249733B2

(12) United States Patent
Wang et al.

(10) Patent No.: US 8,249,733 B2
(45) Date of Patent: Aug. 21, 2012

(54) SYSTEM AND METHOD FOR ANALYZING PERFORMANCE OF AN INDUSTRIAL ROBOT

(75) Inventors: Zhi-Hui Wang, Shenzhen (CN); Ze-Jun Dai, Shenzhen (CN); Xiao-Yun Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 791 days.

(21) Appl. No.: 12/427,752

(22) Filed: Apr. 22, 2009

(65) Prior Publication Data
US 2009/0271020 A1  Oct. 29, 2009

(30) Foreign Application Priority Data

Apr. 28, 2008  (CN) .......................... 2008 1 0301330

(51) Int. Cl.
*G06F 19/00* (2011.01)
*B21D 11/00* (2006.01)

(52) U.S. Cl. ............ 700/109; 700/28; 700/245; 72/369; 72/370.2

(58) Field of Classification Search .............. 700/28–30, 700/109, 145, 245; 72/369, 370.2
See application file for complete search history.

(56) References Cited

U.S. PATENT DOCUMENTS

| 5,642,291 | A  | * | 6/1997  | Prunotto et al.   | 700/145 |
| 5,988,855 | A  | * | 11/1999 | Marobin           | 700/145 |
| 6,192,297 | B1 | * | 2/2001  | Marobin           | 700/245 |
| 6,249,718 | B1 | * | 6/2001  | Gilliland et al.  | 700/255 |
| 6,292,716 | B1 | * | 9/2001  | Moore et al.      | 700/260 |
| 6,507,767 | B2 | * | 1/2003  | Bourne et al.     | 700/165 |
| 7,266,419 | B2 | * | 9/2007  | Sakai et al.      | 700/145 |
| 2008/0066072 | A1 | * | 3/2008 | Yurekli et al.    | 718/104 |

* cited by examiner

*Primary Examiner* — Kakali Chaki
*Assistant Examiner* — Sheela S Rao
(74) *Attorney, Agent, or Firm* — Altis Law Group, Inc.

(57) ABSTRACT

A computing system is communicated with a metal fabrication device for analyzing performance of an industrial robot. The metal fabrication device includes the industrial robot, and a plate bender. The computing system is operable to generate an analysis report of the performance of the industrial robot by providing section model creating function, bending point obtainting function, bending operation monitoring function, workpiece modeling function for the metal fabrication device. The quality of a finished workpiece bent by the industrial robot from a metal plate may be analyzed from the analysis report generated by the computing system.

12 Claims, 5 Drawing Sheets

SYSTEM AND METHOD FOR ANALYZING PERFORMANCE OF AN INDUSTRIAL ROBOT

BACKGROUND

1. Technical Field

Embodiments of the present disclosure relate to automated machines, and more particularly to a system and method for analyzing performance of an industrial robot.

2. Description of Related Art

The performance of industrial robots should be constantly monitored and checked for quality.

Although, there are software programs for monitoring and analyzing robots, there is no suitable software to monitor the quality of workpieces bent by the robot from metal plates.

Accordingly, what is needed is a system and method for amending the above-mentioned deficiencies.

DETAILED DESCRIPTION

All of the processes described below may be embodied in, and fully automated via, functional code modules executed by one or more general purpose computers or processors. The code modules may be stored in any type of computer-readable medium or other computer storage system device. Some or all of the methods may alternatively be embodied in specialized computer hardware.

Figure 1:
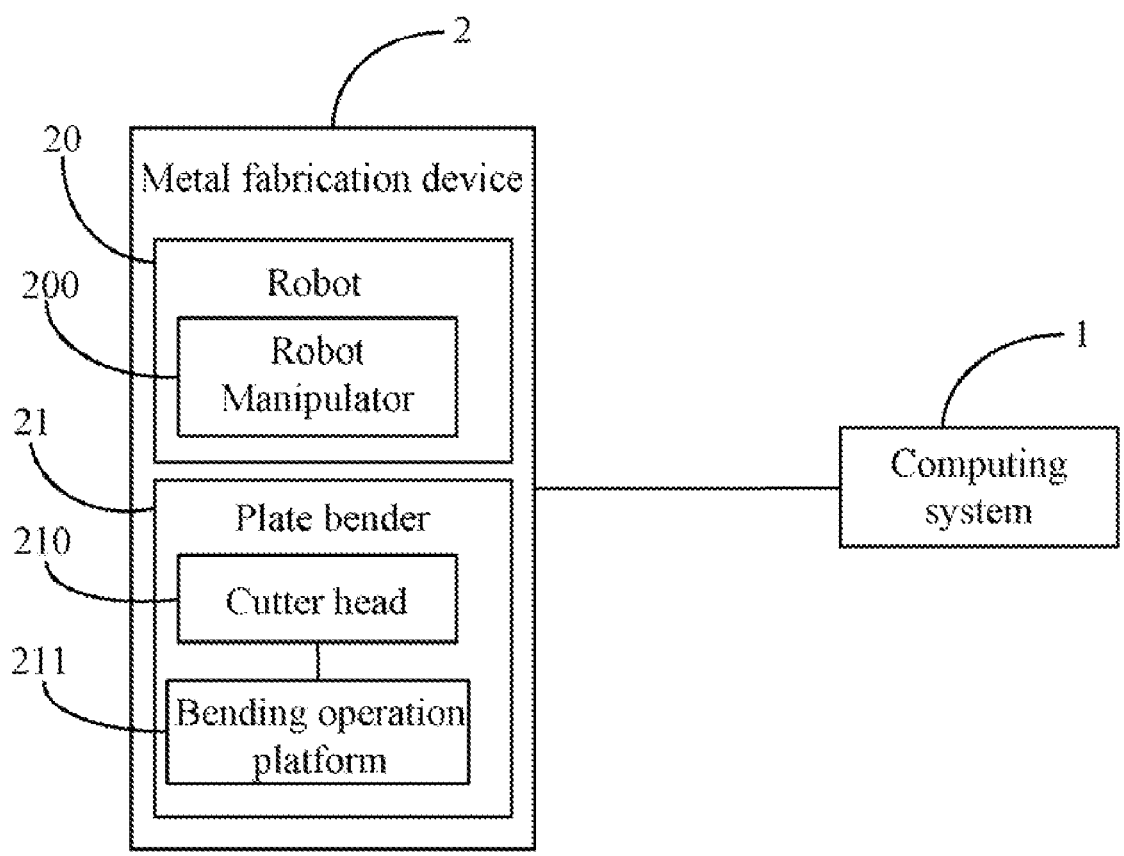
FIG. 1 is a schematic diagram of one embodiment of a system for analyzing performance of an industrial robot.

FIG. 1 is a schematic diagram of one embodiment of a system for analyzing performance of an industrial robot. In one embodiment, the system includes a metal fabrication device 2, and a computing system 1 in communication with the metal fabrication device 2. The metal fabrication device 2 includes an industrial robot 20, and a plate bender 21. The industrial robot 20 includes a robot manipulator 200. The plate bender 21 includes a cutter head 210, and a bending operation platform 211. The plate bender 21 is operable to bend one or more metal plates on the platform 211 through the cutter head 210, according to a preset bending position and a preset bending angle. The industrial robot 20 is operable to support a metal plate to prevent distortion of the metal plate via the robot manipulator 200 when the plate bender 21 is bending the metal plate. The computing system 1 is operable to monitor operation signals from the metal fabrication device 2, and analyze performance of the industrial robot 20 by synchronously modeling a finished workpiece fabricated (bent) from a metal plate, according to the operation signals.

Figure 2:
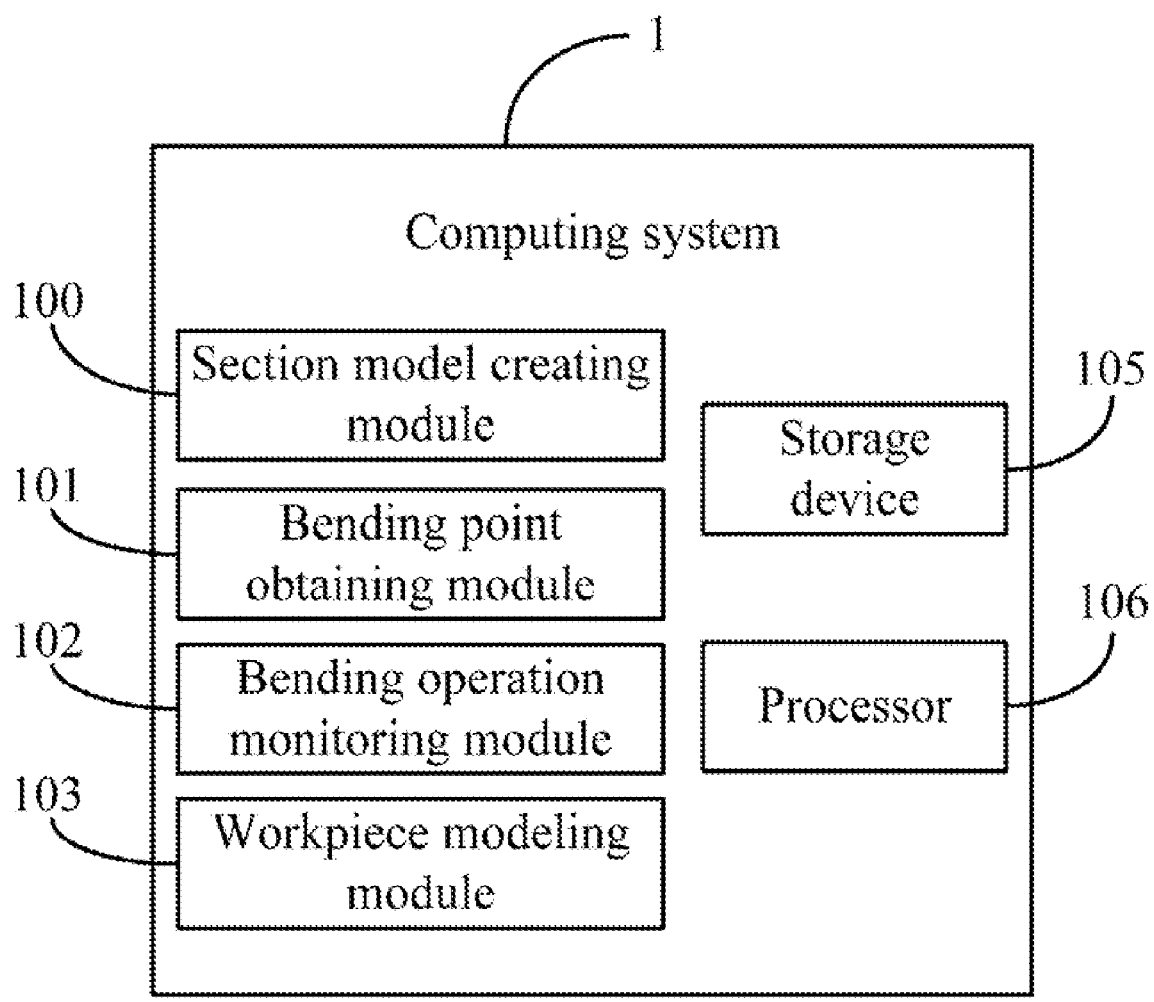
FIG. 2 is a block diagram of function modules of a computing system of FIG. 1.

FIG. 2 is a block diagram of function modules of the computing system 1. In one embodiment, the computing system 1 includes a section model creating module 100, a bending point obtaining module 101, a bending operation monitoring module 102, and a workpiece modeling module 103. The computing system 1 further includes a storage device 105, and a processor 106. The modules 100, 101, 102, 103 may be stored in the storage device 105 and may comprise one or more computerized operations that may be executed by the processor 106 to analyze performance of the industrial robot 20 by synchronously modeling a finished workpiece fabricated (bent) from a metal plate. The storage device 105 may be a hard disk drive, read only memory, random access memory, or a combination thereof. The storage device 105 is used for storing an analysis report of the performance of the industrial robot 20.

Figure 3:
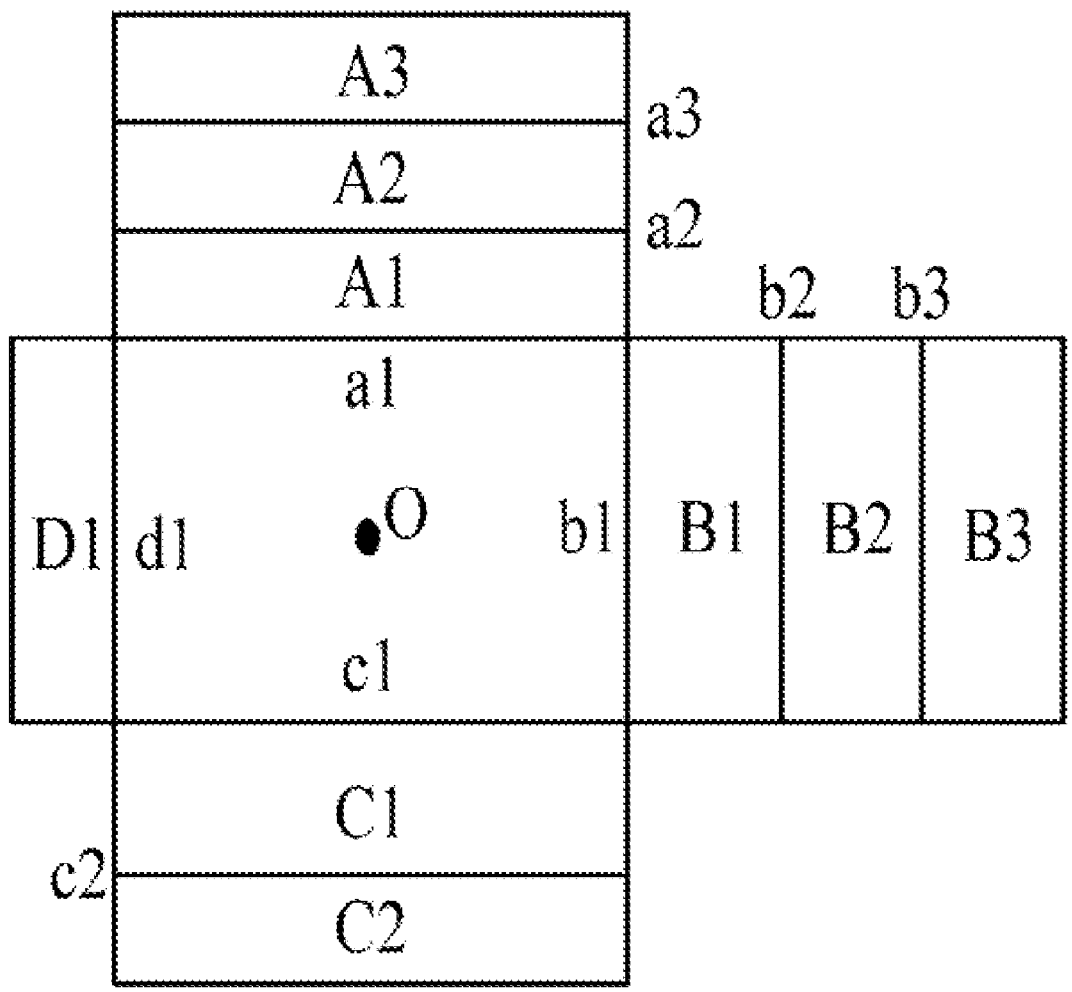
FIG. 3 is a schematic diagram of a metal plate modeled by a section model creating module of FIG. 2.

The section model creating module 100 is operable to set analysis parameters, and create one or more section models to be bent from a metal plate according to the analysis parameters. In one embodiment, each section model includes at least one model crease that represents a real section to be bent from the metal plate by the metal fabrication device 2. The analysis parameters include a number of sections to be bent from a metal plate by the metal fabrication device 2, a distance between a reference point and a model crease of each of the sections, and a predetermined angle of the bend of each of the sections. The reference point is a geometrical center point of a section of a metal plate that is to be used as a control section. It may be understood that all bends and creases and various other manipulations are referenced from the control section. As shown in FIG. 3, each of A1, A2, A3, B1, B2, B3, C1, C2, and D1 respectively represents a section to be formed by bending of a metal plate along creases a1, a2, a3, b1, b2, b3, c1, c2, and d1.

A section surrounded by a1, b1, c1, and d1 is to be used as a control section. All bends and creases and various other manipulations are referenced from the control section surrounded by a1, b1, c1, and d1. The geometrical center point "O" of the control section is the reference point of all sections shown in FIG. 3.

The bending point obtaining module 101 is operable to obtain a bending point of each of the section models. In one embodiment, the bending point obtaining module 101 is operable to obtain a bending point of each of the section models, and obtain a coordinate value of each bending point according to a first coordinate system and the analysis parameters. The origin of the first coordinate system can be considered as a reference point of the section models. The bending point of a section model is a mid-point of a model crease corresponding to the section model.

As used herein, the term "bending line" is defined to an operation line of the cutting edge of the cutter head 210 when the cutter head 210 is being used to bend a metal plate.

As used herein, the term "standard point" is defined to a mid-point of the term "bending line."

The bending point obtaining module 101 is further operable to obtain a standard point and a bending line of the cutter head 210 of the metal fabrication device 2. In one embodiment, the bending point obtaining module 101 is further operable to obtain the standard point and the bending line of the cutter head 210, and obtain a coordinate value of the standard point according to a second coordinate system and attribute data of the cutter head 210. The attribute data of the cutter head 210 typically include shape and dimension data of the cutter head 210.

The bending operation monitoring module 102 is operable to monitor operation signals from the metal fabrication device 2. In one embodiment, the operation signals include a starting fabrication signal, a section complete signal, and an end of fabrication signal.

The workpiece modeling module 103 is operable to analyze whether a section model is acceptable according to the bending point of the section model, and the standard point and the bending line, when the starting fabrication signal is monitored. The workpiece modeling module 103 is further operable to model a finished workpiece corresponding to a section model if the section model is acceptable, generate an analysis report of the performance of the industrial robot 20, and store the analysis report into the storage device 105.

In one embodiment, the analysis of the workpiece modeling module 103 includes converting the coordinate values of a bending point of a section model and the standard point into corresponding coordinate values of a third coordinate system used for the industrial robot 20.

Furthermore, the analysis of the workpiece modeling module 103 includes analyzing whether the corresponding coordinate value of the bending point of the section model is equal to the corresponding coordinate value of the standard point.

Moreover, the analysis of the workpiece modeling module 103 includes determining that the section model is unacceptable if the corresponding coordinate value of the bending point of the section model is not equal to the corresponding coordinate value of the standard point. Otherwise, the analysis of the workpiece modeling module 103 includes analyzing whether the direction of a corresponding model crease of the section model is accordance with the direction of the bending line, if the corresponding coordinate value of the bending point of the section model is equal to the corresponding coordinate value of the standard point.

In addition, the analysis of the workpiece modeling module 103 includes determining that the section model is unacceptable if the direction of the corresponding model crease of the section model is inconsistent with the direction of the bending line, or determining that the section model is acceptable if the direction of the corresponding model crease of the section model is accordance with the direction of the bending line.

In one embodiment, the modeling by the workpiece modeling module 103 includes waiting for the section complete signal if the metal plate model is acceptable. Furthermore, the modeling by the workpiece modeling module 103 includes calculating a position and a relative angle of the reference point changed by the industrial robot 20 according to movement data of the robot manipulator 200, when the section complete signal is monitored. In addition, the modeling by the workpiece modeling module 103 includes dividing all the section models into two groups according to a corresponding model crease of the section model, and changing an angle of a group that is farther from the industrial robot 20 according to the relative angle, so as to model a finished workpiece corresponding to the section model. Further details of finding the relative angle will be explained below.

The movement data of the robot manipulator 200 is reported by the industrial robot 20. The relative angle is equal to an actual bending angle of a section represented by the section model, and is equal to the changed angle of the group that is farther from the industrial robot 20. The analysis report includes comparison data between the predetermined angle of the bend of the section model and the actual bending angle of the section model.

Figure 4:
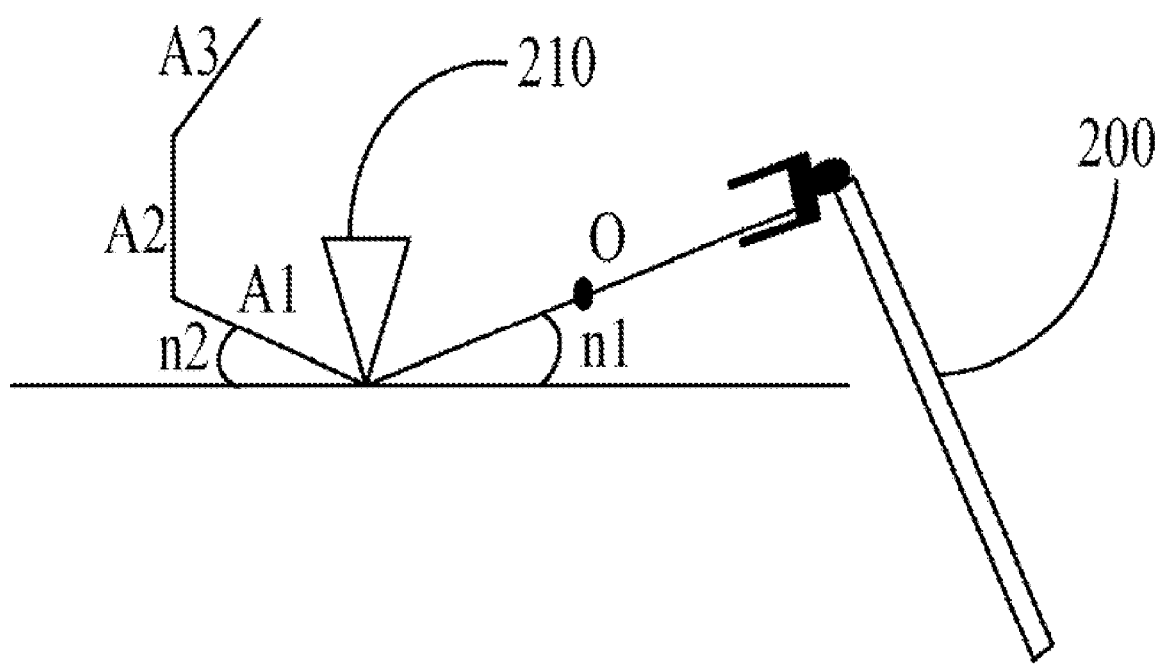
FIG. 4 is a schematic diagram of fabrication with a metal plate modeled by a workpiece modeling module of FIG. 2.

FIG. 4 is a schematic diagram of fabrication with a metal plate modeled by a workpiece modeling module 103. As shown in FIG. 4, the cutter head 210 is being located at a1 of A1 to bend A1, the relative angle of the reference point "O" changed by the robot manipulator 200 of the industrial robot 20 is "n1," the group of A1, A2, and A3 is farther from the industrial robot 20, the angle of the group changed by the workpiece modeling module 103 is "n2", wherein n1 equals to n2. A1, A2, and A3 are made a whole in the bending operation on A1, relative positions among A1, A2, and A3 are not changed.

Figure 5:
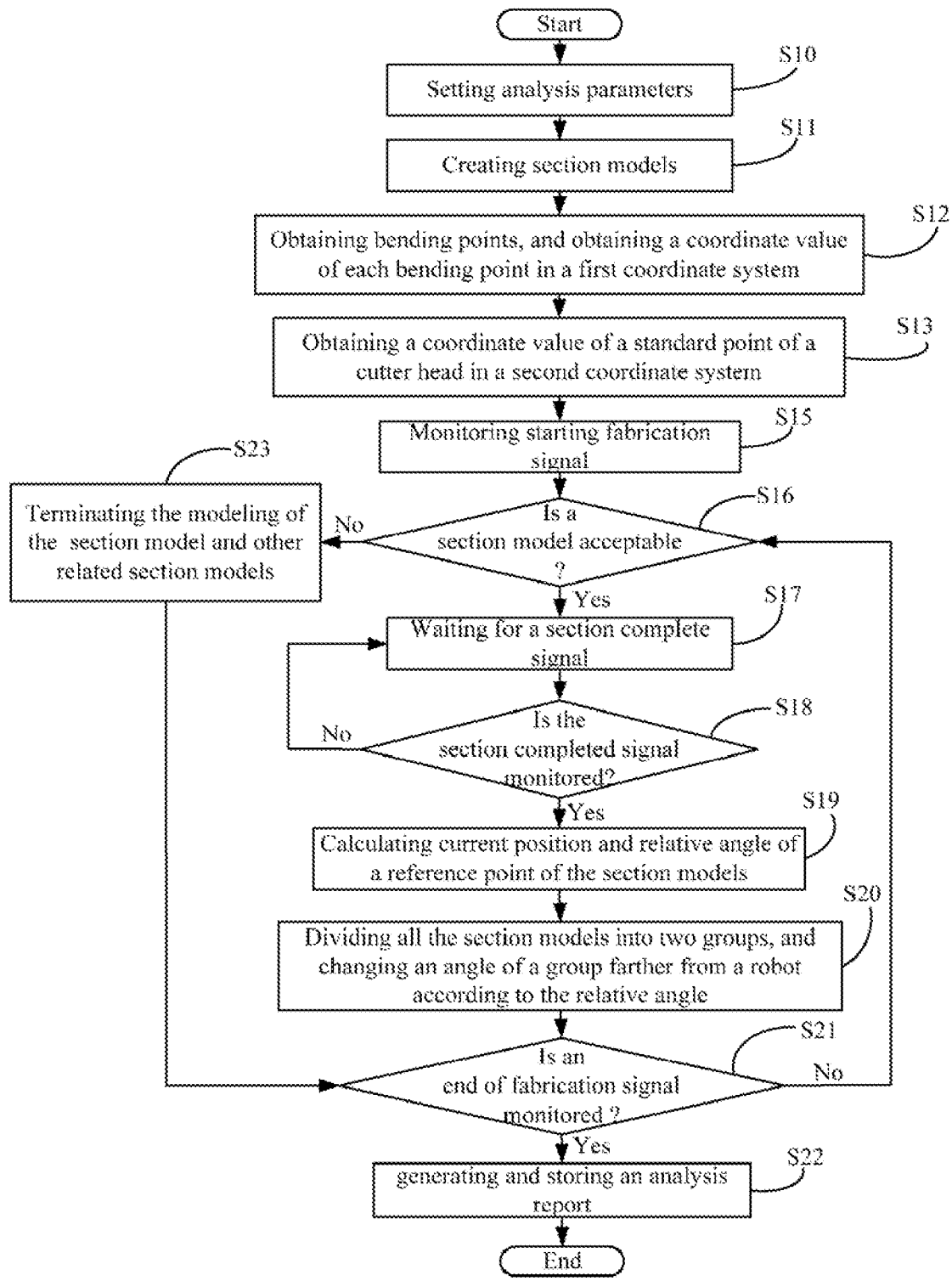
FIG. 5 is a flowchart of one embodiment of a method for analyzing performance of an industrial robot.

FIG. 5 is a flowchart of one embodiment of a method for analyzing performance of an industrial robot in accordance with the present disclosure. Depending on the embodiment, additional blocks may be added, others removed, and the ordering of the blocks may be changed.

In block S10, analysis parameters are manually or automatically configured with the computing system 1 via the section model creating module 100. In one embodiment, the analysis parameters include a number of sections to be bent from a metal plate by the metal fabrication device 2, a distance between a reference point and a model crease of each of the sections, and a predetermined angle of the bend of each of the sections.

In block S11, the section model creating module 100 creates one or more section models to be bent from a metal plate according to the analysis parameters, wherein each section model includes at least one model crease that represents a real section to be bent from the metal plate by the metal fabrication device 2.

In block S12, the bending point obtaining module 101 obtains a bending point of each of the section models. The bending point of a section model corresponds to a standard point of the cutter head 210, when the metal fabrication device 2 is bending the section model. In one embodiment, the bending point obtaining module 101 obtains a bending point of each of the section models, and obtains a coordinate value of each bending point according to the first coordinate system and the analysis parameters.

In block S13, the bending point obtaining module 101 obtains the standard point and a bending line of the cutter head 210 of the metal fabrication device 2. In one embodiment, the bending point obtaining module 101 obtains the standard point and the bending line of the cutter head 210, and obtains a coordinate value of the standard point according to the second coordinate system and attribute data of the cutter head 210.

In block S15, the bending operation monitoring module 102 monitors operation signals from the metal fabrication device 2. In one embodiment, the operation signals include a starting fabrication signal, a section complete signal, and an end of fabrication signal.

In block S16, the workpiece modeling module 103 analyzes whether a section model is acceptable according to the bending point of the section model, the standard point and the bending line, when the starting fabrication signal is monitored.

In one embodiment, the analysis of the workpiece modeling module 103 includes converting the coordinate values of a bending point of a section model and the standard point into corresponding coordinate values of a third coordinate system used for the industrial robot 20.

Furthermore, the analysis of the workpiece modeling module 103 includes analyzing whether the corresponding coordinate value of the bending point of the section model is equal to the corresponding coordinate value of the standard point.

Moreover, the analysis of the workpiece modeling module 103 includes determining that the section model is unacceptable if the corresponding coordinate value of the bending point of the section model is not equal to the corresponding coordinate value of the standard point. Otherwise, the analysis of the workpiece modeling module 103 includes analyzing whether the direction of a corresponding model crease of the section model is accordance with the direction of the bending line, if the corresponding coordinate value of the bending point of the section model is equal to the corresponding coordinate value of the standard point.

In addition, the analysis of the workpiece modeling module 103 includes determining that the section model is unacceptable if the direction of the corresponding model crease of the section model is inconsistent with the direction of the bending line, or determining that the section model is acceptable if the direction of the corresponding model crease of the section model is accordance with the direction of the bending line.

If the section model is unacceptable, in block S23, the workpiece modeling module 103 terminates the modeling of the section model and other section models related with the section model, then the procedure goes directly to block S21 described below.

Otherwise, if the section model is acceptable, in block S17, the workpiece modeling module 103 waits for the section complete signal.

In block S18, the bending operation monitoring module 102 monitors the section complete signal from the metal fabrication device 2.

If the section complete signal is not monitored, then the procedure returns to block S17 as described above. Otherwise, if the section complete signal is monitored, in block S19, the workpiece modeling module 103 calculates a position and a relative angle of the reference point changed by the industrial robot 20 according to movement data of robot manipulator 200. The movement data of the robot manipulator 200 is reported by the industrial robot 20.

In block S20, the workpiece modeling module 103 divides all the section models into two groups according to a corresponding model crease of the section model, and changes an angle of a group that is farther from the industrial robot 20 according to the relative angle, so as to model a finished workpiece corresponding to the section model.

In block S21, the bending operation monitoring module 102 monitors the end of fabrication signal.

If the end of fabrication signal is not monitored, then the procedure returns to block S16 as described above, so as to model another finished workpiece corresponding to another section model. Otherwise, if the end of fabrication signal is monitored, in block S22, the workpiece modeling module 103 generates an analysis report of the performance of the industrial robot 20, and stores the analysis report into the storage device 105.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for analyzing performance of an industrial robot, the computing system in communication with a metal fabrication device for bending metal plates, the computing system comprising:
    a section model creating module operable to set analysis parameters for analyzing performance of the industrial robot, and create one or more section models according to the analysis parameters, each section model comprising at least one model crease, the model crease representing a real section to be bent from a metal plate by the metal fabrication device;
    a bending point obtaining module operable to obtain a bending point of each of the section models, and obtain a standard point and a bending line of a cutter head of the metal fabrication device;
    a bending operation monitoring module operable to monitor operation signals from the metal fabrication device, wherein the operation signals comprise a starting fabrication signal; and
    a workpiece modeling module operable to analyze whether a section model is acceptable according to the bending point of the section model, the standard point and the bending line, model a finished workpiece corresponding to a section model if the section model is acceptable, generate an analysis report of the performance of the industrial robot, and store the analysis report into a storage device
    obtaining a coordinate value of the bending point of a section model and a coordinate value of the standard point in a coordinate system used for the industrial robot of the metal fabrication device;
    analyzing whether the coordinate value of the bending point of the section model is equal to the coordinate value of the standard point;
    determining that the section model is unacceptable if the coordinate value of the bending point of the section model is not equal to the coordinate value of the standard point, or analyzing whether the direction of a corresponding model crease of the section model is accordance with the direction of the bending line, if the coordinate of the bending point of the section model is equal to the coordinate of the standard point; and
    determining that the section model is unacceptable if the direction of the corresponding model crease of the section model is inconsistent with the direction of the bending line, or determining that the section model is acceptable if the direction of the corresponding model crease of the section model is accordance with the direction of the bending line.

2. The system as claimed in claim 1, wherein the analysis parameters comprise a number of sections to be bent from a metal plate by the metal fabrication device, a distance between a reference point and a model crease of each of the sections, and a predetermined angle of the bend of each of the sections.

3. The system as claimed in claim 1, wherein the operation signals further comprise a section complete signal, and an end of fabrication signal.

4. The system as claimed in claim 3, wherein the modeling by the workpiece modeling module comprises:
    waiting for the section complete signal if the metal plate model is acceptable;
    calculating a position and a relative angle of the reference point changed by the industrial robot of the metal fabrication device according to movement data reported by the industrial robot, if the section complete signal is monitored;
    dividing all the section models into two groups according to a corresponding model crease of the section model; and
    changing an angle of a group that is farther from the industrial robot according to the relative angle, so as to model a finished workpiece corresponding to the section model.

5. A computer-implemented method for analyzing performance of an industrial robot, the method comprising:
    (a) setting analysis parameters for analyzing performance of the industrial robot, and creating one or more section models according to the analysis parameters, each section model comprising at least one model crease, the model crease representing a real section to be bent from a metal plate by a metal fabrication device;

(b) obtaining a bending point of each of the section models, and obtaining a standard point and a bending line of a cutter head of the metal fabrication device;

(c) monitoring operation signals from the metal fabrication device, wherein the operation signals comprise a starting fabrication signal;

(d) analyzing whether a section model is acceptable according to the bending point of the section model, the standard point and the bending line, if the starting fabrication signal is monitored;

(d1) obtaining a coordinate value of the bending point of a section model and a coordinate value of the standard point in a coordinate system used for the industrial robot of the metal fabrication device;

(d2) analyzing whether the coordinate value of the bending point of the section model is equal to the coordinate value of the standard point;

(d3) determining that the section model is unacceptable if the coordinate value of the bending point of the section model is not equal to the coordinate value of the standard point, or analyzing whether the direction of a corresponding model crease of the section model is accordance with the direction of the bending line, if the coordinate value of the bending point of the section model is equal to the coordinate value of the standard point; and (d4) determining that the section model is unacceptable if the direction of the corresponding model crease of the section model is inconsistent with the direction of the bending line, or determining that the section model is acceptable if the direction of the corresponding model crease of the section model is accordance with the direction of the bending line;

(e) modeling a finished workpiece corresponding to a section model if the section model is acceptable;

(f) generating an analysis report of the performance of the industrial robot; and (g) storing the analysis report into a storage device.

6. The method as claimed in claim 5, wherein the analysis parameters comprise a number of sections to be bent from a metal plate by the metal fabrication device, a distance between a reference point and a model crease of each of the sections, and a predetermined angle of the bend of each of the sections.

7. The method as claimed in claim 5, wherein the operation signals further comprise a section complete signal, and an end of fabrication signal.

8. The method as claimed in claim 7, wherein the step (e) comprises:

(e1) waiting for the section complete signal if the metal plate model is acceptable;

(e2) calculating a position and a relative angle of the reference point changed by the industrial robot of the metal fabrication device according to movement data reported by the industrial robot, if the section complete signal is monitored;

(e3) dividing all the section models into two groups according to a corresponding model crease of the section model; and (e4) changing an angle of a group that is farther from the industrial robot according to the relative angle, so as to model a finished workpiece corresponding to the section model.

9. A computer-readable memory having stored thereon instructions for analyzing performance of an industrial robot that, when executed by a computer, cause the computer to perform a method, the method comprising:

(i1) setting analysis parameters for analyzing performance of the industrial robot, and creating one or more section models according to the analysis parameters, each section model comprising at least one model crease, the model crease representing a real section to be bent from a metal plate by a metal fabrication device;

(i2) obtaining a bending point of each of the section models, and obtaining a standard point and a bending line of a cutter head of the metal fabrication device;

(i3) monitoring operation signals from the metal fabrication device, wherein the operation signals comprise a starting fabrication signal;

(i4) analyzing whether a section model is acceptable according to the bending point of the section model, the standard point and the bending line, if the starting fabrication signal is monitored;

(i41) obtaining a coordinate value of the bending point of a section model and a coordinate value of the standard point in a coordinate system used for the industrial robot of the metal fabrication device;

(i42) analyzing whether the coordinate value of the bending point of the section model is equal to the coordinate value of the standard point;

(i43) determining that the section model is unacceptable if the coordinate value of the bending point of the section model is not equal to the coordinate value of the standard point, or analyzing whether the direction of a corresponding model crease of the section model is accordance with the direction of the bending line, if the coordinate value of the bending point of the section model is equal to the coordinate value of the standard point; and (i44) determining that the section model is unacceptable if the direction of the corresponding model crease of the section model is inconsistent with the direction of the bending line, or determining that the section model is acceptable if the direction of the corresponding model crease of the section model is accordance with the direction of the bending line;

(i5) modeling a finished workpiece corresponding to a section model if the section model is acceptable;

(i6) generating an analysis report of the performance of the industrial robot; and (i7) storing the analysis report into a storage device.

10. The memory as claimed in claim 9, wherein the analysis parameters comprise a number of sections to be bent from a metal plate by the metal fabrication device, a distance between a reference point and a model crease of each of the sections, and a predetermined angle of the bend of each of the sections.

11. The memory as claimed in claim 9, wherein the operation signals further comprise a section complete signal, and an end of fabrication signal.

12. The memory as claimed in claim 11, wherein the step (i5) comprises:

(i51) waiting for the section complete signal if the metal plate model is acceptable;

(i52) calculating a position and a relative angle of the reference point changed by the industrial robot of the metal fabrication device according to movement data reported by the industrial robot, if the section complete signal is monitored;

(i53) dividing all the section models into two groups according to a corresponding model crease of the section model; and (i54) changing an angle of a group that is farther from the industrial robot according to the relative angle, so as to model a finished workpiece corresponding to the section model.

* * * * *